Jan. 6, 1948.  E. D. RANEY  2,434,052
MOTION TRANSMITTING LINKAGE FOR INSTRUMENTS
Filed Nov. 26, 1943
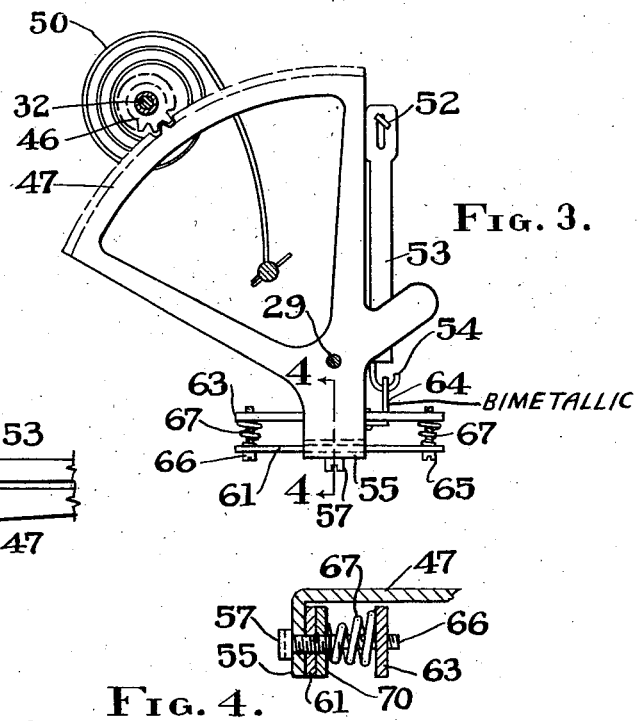
INVENTOR
ELdon D. Raney
BY
Warren H. F. Schmieding
ATTORNEY Patented Jan. 6, 1948

2,434,052

UNITED STATES PATENT OFFICE 2,434,052

MOTION TRANSMITTING LINKAGE FOR INSTRUMENTS

Eldon D. Raney, Columbus, Ohio, assignor to Ranco Incorporated, Columbus, Ohio

Application November 26, 1943, Serial No. 511,813

4 Claims. (Cl. 73—407)

This invention relates generally to gages and is particularly directed to improvements in mechanism for transmitting motion between gage parts and for adjusting such parts to secure more accurate operation of the gages to which the mechanism is applied.

An object of the invention is to provide a gage of the type having a diaphragm or other pressure responsive member and a pointer disposed for movement over a dial, with novel mechanism for transmitting movement from the pressure responsive member to the pointer, the motion transmitting mechanism having a plurality of adjustments by means of which the instrument may be more readily and accurately set to give correct indications.

Another object is to provide a gage having a pressure responsive member, a pivoted pointer, and a pinion and sector for imparting movement to the pointer, the sector being pivotally mounted and having motion transmitted thereto from the pressure responsive device by link and complemental connecting means, the latter being so formed as to provide both range and zero adjustments for the pointer, a second adjustment for changing the range in small increments also being provided.

An object is to provide a gage with mechanism for connecting the motion transmitting link and the pointer moving sector, the mechanism including an eye member for receiving one end of the link, a pair of strip-like plates, one of the plates having the eye member connected thereto and the other being connected to the sector, and means to connect the plates whereby the corresponding ends of the plates, at either end thereof, may be adjusted toward or away from one another to change the range of zero setting of the pointer.

Further objects and advantages of the present invention will be apparent from the following description, reference being had to the accompanying drawings wherein a preferred form of embodiment of the invention is clearly shown.

In the drawings:

Fig. 1 is a side elevational view of a gage provided with connection mechanism formed in accordance with the present invention, the housing of the gage being removed to show the internal mechanism;

Fig. 2 is a detail horizontal sectional view taken on the plane indicated by the line 2—2 of Fig. 1;

Fig. 3 is a horizontal sectional view taken through the gate on the plane indicated by the line 3—3 of Fig. 1; and Fig. 4 is a detail vertical sectional view taken on the plane indicated by the line 4—4 of Fig. 3.

The connection mechanism to which this application is directed is adaptable for use in many capacities. For the purpose of convenience, however, it has been illustrated as a part of a manifold pressure gage of the type used in airplanes. This manifold pressure gage, designated generally by the numeral 20, includes a base 21 having supporting columns 22 extending upwardly therefrom. These columns support a plate 23 at their upper ends, a plurality of posts 24 being secured to and projecting upwardly from the plate 23. The upper ends of these posts in turn support a supplemental plate 25, the plates 23 and 25 serving to support the actuating mechanism 26 of the gage. The plate 23 has block members 27 secured thereto for the reception of cone pointed bearing screws 28 which provide pivotal supports for staff members 29, the latter being, in turn, provided at their upper ends with cone points 30 for engagement with the under surface of the plate 25, suitable depressions being formed in the plate to receive and serve as bearings for these points.

At their central portions, the plates 23 and 25 are provided with bearings, not shown, in which indicator staffs 32 and 33 are journalled. These staffs also extend through a central opening in a dial 34 suitably secured to the upper surface of the plate 25. The outwardly projecting ends of the staffs 32 and 33 receive pointers 35 and 36, one being used to indicate the pressure in the manifold of one engine or bank of cylinders and the other being used to indicate the manifold pressure for another engine or bank of cylinders.

The gage is actuated by any suitable type of motor or motors and is herein provided with a pair of pressure responsive devices 37, only one of which is illustrated. This pressure responsive device includes a pair of diaphragms 38 connected at their central portions by a member 39 and rigidly secured to the columns 22 by having their end caps 42 clamped in recesses 43, formed in the columns, by clamp plates 44, suitable screws 45 being employed to secure the clamp plates to the columns. As illustrated in Figs. 1 and 3, the staffs 32 and 33 are provided with pinions 46, the teeth of which are disposed in meshing engagement with similar teeth formed on sectors 47. Each sector 47 is secured to a staff 29 which, as previously described, is pivotally supported between the plates 23 and 25. Movement will be imparted to the pointer staffs by pivotal movement of the sectors 47 on the staffs 29, Suitable hair springs 50 are connected with the staffs 32 and 33 to cause the pointers carried thereby to return to their normal settings.

In the use of these gages, pressure is introduced to one diaphragm 38 of each set through a tube 51 extending to a connection in the base 21. This introduction of pressure causes the diaphragm to expand and impart longitudinal movement to the center connection 39. This motion must be transmitted from the diaphragms to the proper indicator pointer to provide the pilot with a visible indication of the manifold pressure. To transmit this movement to the pointer, a post 52 is secured to the connection 39, the post projecting upwardly into the space between the plates 23 and 25. The upper end of this post connects with one end of a link 53, the opposite end of which is provided with a hook 54. This hook 54 is connected with the sector 47 whereby motion imparted to the post 52 by the diaphragm 38 will be transmitted to the sector by the link 53.

To connect the hook 54 with the sector 47, the latter is provided in spaced relation from the staff 29 with a downwardly projecting arm 55. This arm 55 has an opening 56 formed therein for the reception of a screw 57 which also projects through a slot 58 provided in a strip 61 forming a part of a connecting unit 62. This connecting unit includes a second strip 63 which has a bimetallic eye plate 64 secured thereto in closer proximity to one end of the strip 63 than to the other, the plate 64 being disposed in spaced relation to the staff 29. The strips 61 and 63 are connected by a pair of adjusting screws 65 and 66 located adjacent the ends of these members. The screws extend through clearance holes in the plate 61 and are threaded into the plate 63 so that when the screws are turned, the plate 63 will move longitudinally of the screws. Coil springs 67 are disposed between the plates to maintain the heads of the screws in contact with the plate 61 at all times. The springs also serve to maintain the strips 61 and 63 in spaced relation. After the parts have been assembled as shown in Figs. 2 and 3, the entire connection unit 62 may be adjusted relative to the sector 47 by loosening the screw 57 and moving the unit transversely. This movement will vary the spacing between the staff 29 and the point on the eye member 64 with which the link 53 is connected. This variation, depending upon the direction of movement, will increase or decrease the travel or range of the indicator pointer operated by this particular sector, for a given movement of the pressure responsive device. When an approximately correct setting of the unit 62 has been secured, the screw 57 is tightened to lock the unit in this adjusted position, the screw having a nut 70 provided on the inner end to clamp the plate 61 to the arm 55.

In the event the exact range has not been secured by the adjustment of the unit 62, a fine adjustment can be secured by turning the screw 66. This screw is located at the end of the unit 62 most remote from the eye member 64. Adjustment of this screw causes the strip 63 to pivot about the other screw 65 whereby the end of the eye member 64, to which the link 53 is connected, will move toward or away from the staff 29, thus changing in small increments the leverage between the staff and link and the staff and pinion.

Before making this adjustment, it may be necessary to adjust the indicator pointer to position it on zero or the normal, low pressure indication. This adjustment is secured by turning the screws 65 and 66 to vary the distance between the plates 61 and 63. This movement changes the effective length of the connection link 53 between the post 52 and the sector 47 and causes the sector to turn about the axis of its staff. This movement is transmitted to the pinion and the pointer.

Since the eye member 64 is composed of bimetal, temperature changes which might affect the range of the indicator pointer will also cause this eye member to flex and change the leverage and thus compensate for such temperature changes. From the foregoing, it will be apparent that a new and improved connecting device has been provided which will facilitate the assembly and adjustment of pressure gages or similar instruments. The unit will permit coarse or fine adjustments in range as well as zero adjustments.

While the form of embodiment of the present invention as herein disclosed constitutes a preferred form, it is to be understood that other forms might be adopted, all coming within the scope of the claims which follow.

I claim:

1. In a gage having a motor and a pivotally mounted actuated device; means for transmitting motion from said motor to said device comprising a pinion fixed to the pivot for said device; a pivoted sector disposed in meshing engagement with said pinion; a plate-like strip secured to said sector; a second strip adjustably secured at its opposite ends to the ends of said first strip; and link means connecting the intermediate portion of said second strip with said motor.

2. In a gage having a motor and a pivotally mounted actuated device; means for transmitting motion from said motor to said device comprising a pinion fixed to the pivot for said device; a pivoted sector disposed in meshing engagement with said pinion; link means connected with said motor; a coupling connected with said link; means connecting said coupling and said sector, said means having a pair of superposed strip-like plates, one of said plates being secured to said sector, the other plate carrying said coupling; spring means disposed between the ends of said plates, said spring means tending to increase the distance between the plates; and means engaging said plates to move the ends thereof in opposition to said springs.

3. In a gage having a motor and a pivotally mounted actuated device; means for transmitting motion from said motor to said device comprising a pinion fixed to the pivot for said device; a pivoted sector disposed in meshing engagement with said pinion; link means connected with said motor; a coupling connected with said link; means connecting said coupling and said sector, said means having a pair of strip-like plates, said coupling being carried by one of said plates; means connecting said plates, said means providing for independent adjustment of the end portions of said plates toward and away from one another; and means connecting said plates to said sector, said means providing for lateral adjustment of said plates and said coupling as a unit relative to the pivotal axis of said sector.

4. In a gage having a motor and a pivotally mounted actuated device; means for transmitting motion from said motor to said device comprising a pinion fixed to the pivot for said device; a pivoted sector disposed in meshing engagement with said pinion; a coupling; link means connecting said motor and said coupling; means for connecting said coupling to said sector, said means having a pair of spaced plates, said coupling being connected to one of said plates adjacent to one end thereof; means connecting the other plate to said sector; and means for changing the spacing between said plates.

ELDON D. RANEY.

REFERENCES CITED

The following references are of record in the file of this patent:

UNITED STATES PATENTS

| Number | Name | Date |
|---|---|---|
| 1,195,750 | Trane | Aug. 22, 1916 |
| 1,891,134 | Barthel | Dec. 13, 1932 |
| 2,324,666 | Angst | July 20, 1943 |
| 1,623,333 | Briggs et al. | Apr. 5, 1927 |
| 2,141,211 | Hopkins | Dec. 27, 1938 |
| 2,387,909 | Ingham, Jr. | Oct. 30, 1945 |

FOREIGN PATENTS

| Number | Country | Date |
|---|---|---|
| 175,063 | Switzerland | Apr. 16, 1935 |